United States Patent [19]
VanderPol et al.

[11] Patent Number: 5,743,539
[45] Date of Patent: Apr. 28, 1998

[54] QUICK SETTING AND RELEASE ACTUATOR FOR WORK HOLDER

[75] Inventors: Jerald W. VanderPol, Shingle Springs; Mark A. Marshall, Sacramento; Donald T. Stanley, Lincoln; Clement Tremblay, Citrus Heights, all of Calif.

[73] Assignee: Tri Tool Inc., Rancho Cordova, Calif.

[21] Appl. No.: 660,884

[22] Filed: Jun. 10, 1996

[51] Int. Cl.$^6$ .............................. B23B 31/20; B23B 5/16
[52] U.S. Cl. .................. 279/58; 82/113; 269/236; 279/51; 279/54; 408/104
[58] Field of Search .................... 269/236; 408/104, 408/105–107; 279/51, 54, 55, 58; 82/113

[56] References Cited

U.S. PATENT DOCUMENTS

| | | | |
|---|---|---|---|
| 123,197 | 1/1872 | Plimpton et al. | 279/74 |
| 425,224 | 4/1890 | Hartness | 279/57 |
| 489,933 | 1/1893 | Conradson | 279/57 |
| 658,473 | 9/1900 | Smith et al. | 279/57 |
| 1,400,306 | 12/1921 | Miller | 279/74 |
| 2,387,511 | 10/1945 | Henry et al. | 279/51 |
| 2,397,159 | 3/1946 | Schneider | 279/51 |
| 2,460,149 | 1/1949 | Schoensiegel | 279/57 |
| 2,517,346 | 8/1950 | Queitzsch | 279/74 |
| 2,523,603 | 9/1950 | Tuggle | 269/236 |
| 2,735,689 | 2/1956 | Madsen | 279/74 |
| 2,851,274 | 9/1958 | Greer | 279/58 |
| 3,542,355 | 11/1970 | Klancnik | 408/104 |
| 4,319,503 | 3/1982 | Saine et al. | 409/104 |
| 4,655,108 | 4/1987 | Galos | 269/236 |

FOREIGN PATENT DOCUMENTS

860956  1/1941  France ..................... 279/51

*Primary Examiner*—Steven C. Bishop
*Attorney, Agent, or Firm*—Bacon & Thomas

[57] ABSTRACT

A quick setting and release actuator for cooperating with an axially movable chuck for holding a tubular workpiece in fixed position includes an anchor member (12) that is mounted in fixed relationship relative to a housing of a machine tool (20) and a thrust member (42) carried by a pivotally mounted carrier member (38) that pivots towards and away from the anchor member to drive the thrust member (42) into engagement with the end wall (44) of a multi-segment collet (26) to cause the collet to ride along its segment bearing surfaces (30) in a radial direction to engage the periphery of a workpiece (24) to be retained in the machine tool (20). Thrust member (42) may be pivotally mounted by a pivot connection (48) on the carrier (38) so that the thrust member will align itself with the end wall (44) of collet (26) even when the carrier is not precisely parallel with the collet end wall. In an alternative arrangement, rounded thrust pins may be used to transmit axial force to the collet (26) and this arrangement may include a thrust transmitting spacer (86). A lever (50) and cam (52) arrangement is provided to exert positive force on the carrier (38) at its terminal pivoted position by means of a thrust rod (54) cooperating with a thrust nut (58) connected to the thrust rod. A quick release pivot connection (40) may be provided to enable quick separation of the carrier (38) from its normal operating position adjacent the anchor member to thereby permit quick changing of the collet in the tool.

27 Claims, 4 Drawing Sheets

FIG. 6

QUICK SETTING AND RELEASE ACTUATOR FOR WORK HOLDER

BACKGROUND OF THE INVENTION

1. Field of the Invention

This invention relates to an actuator for driving a work holding chuck into clamping position to hold a tubular workpiece in a machine tool or the like.

2. Related Information and General Discussion

It is common to use various arrangements of chucks to hold workpieces, particularly tubular workpieces, in clamped position in machine tools designed to perform machining or cutting operations on the workpiece. When split collet chucks are used with tapered bearing surfaces or the like, relative axial movement of the collet sections and their bearing surfaces drives the collet sections radially inwardly, or outwardly, depending on the design of the chuck, to clamp onto the adjacent periphery or circumference of a tubular workpiece extending axially through a center bore of the collet or about the periphery of the collet sections. Such collets may be regarded as axially actuated in the sense that they are driven into engagement with a workpiece in response to relative axial movement between the collet sections and their bearing surfaces.

In such axially actuated collet type chucks, some means must be provided to apply axial motion to the collet system to effect clamping of the workpiece. It is common to use rotary threaded thimbles, levers, thrust nut elements and the like that are mechanically or manually moved to apply axial thrust against the collet systems for clamping workpieces in the collet. Such collet arrangements can be seen, for example, in U.S. Pat. Nos. 489,933-Conradson; 658,473-Smith et al.; 123,197-Plinton et al.; 425,224-Hartness; 1,400,306-Miller; 2,460,149-Schonsiegel; 2,517,346-Queitzsch; 2,735,689-Madsen; and 4,319,503-Saine et al.

It is highly desirable that split collet work holders be actuated by quick setting and release arrangements that permit rapid securing and release of workpieces in a tool to enable high rates of productivity with the tool. Several of the prior art patents mentioned above include such quick setting and release mechanisms. However, they generally lack simplicity, low cost, and the ability to quickly change the collets to accommodate different size workpieces. Also, the various prior art collet actuators require somewhat complicated and relatively heavy structural arrangements that maintain the collet driving mechanism parallel to the collet system so that all collet sections are driven into clamping position uniformly so that the workpiece is maintained centered in the central bore of the collet.

BRIEF SUMMARY OF THE INVENTION

This invention provides a quick setting and release actuator for cooperating with an axially movable chuck for holding a tubular workpiece. The actuator includes an anchor member and a thrust member carrier that is pivotable towards and away from the anchor member; at least one thrust member mounted on the carrier for pivotal movement with the carrier; and a locking device for securing the carrier and thrust member at a forward pivoted position and for preventing pivotal movement of the carrier and the thrust member away from the anchor member.

The actuator in one embodiment is mounted adjacent a split collet system such that, upon pivoting of the carrier towards the anchor member, the thrust member engages the collet sections and drives them forwardly relative to tapered collet bearing surfaces to cause clamping of the collet about a tubular workpiece extending through the central bore of the collet.

A manually operable lever and a cam connected to the lever are provided to enable a mechanical advantage to be obtained to drive the carrier into its forward terminal pivoted position with the thrust member engaging the collet sections and to lock the thrust member against the collet to secure the collet in clamped engagement with a workpiece.

The anchor member is arranged to be secured to or incorporated in a machine tool in an appropriate manner so that it remains fixed relative to the tool housing during operation of the actuator. The carrier is pivotally mounted by a quick release pin that enables the carrier to be quickly removed from a location adjacent the anchor member to enable quick changing of the collet in the tool.

A thrust member in one embodiment of the invention is pivotally mounted on the carrier so that it is independently rotatable relative to the carrier as it engages the collet sections upon forward pivotal motion of the carrier towards the collet. This enables the thrust member to maintain a parallel position relative to the collet sections to thereby drive all the collet sections uniformly during actuation of the collet into a clamped position.

In this embodiment of the invention, the pivot axis of the thrust member lies in the same plane that includes the pivot axis of the carrier and the pivot axis of the thrust member preferably extends parallel to the pivot axis of the carrier.

In another embodiment of the invention, a pair of thrust members comprising rounded pins are mounted on the carrier so that they are moved towards the collet system when the carrier is pivoted towards its forward pivoted position. In accordance with this embodiment of the invention, the rounded thrust members are used with a thrust transmitting spacer that is guided in an axial opening extending parallel to the bore of the collet.

DETAILED DESCRIPTION OF PREFERRED EMBODIMENT OF THE INVENTION

Figures 1, 4:
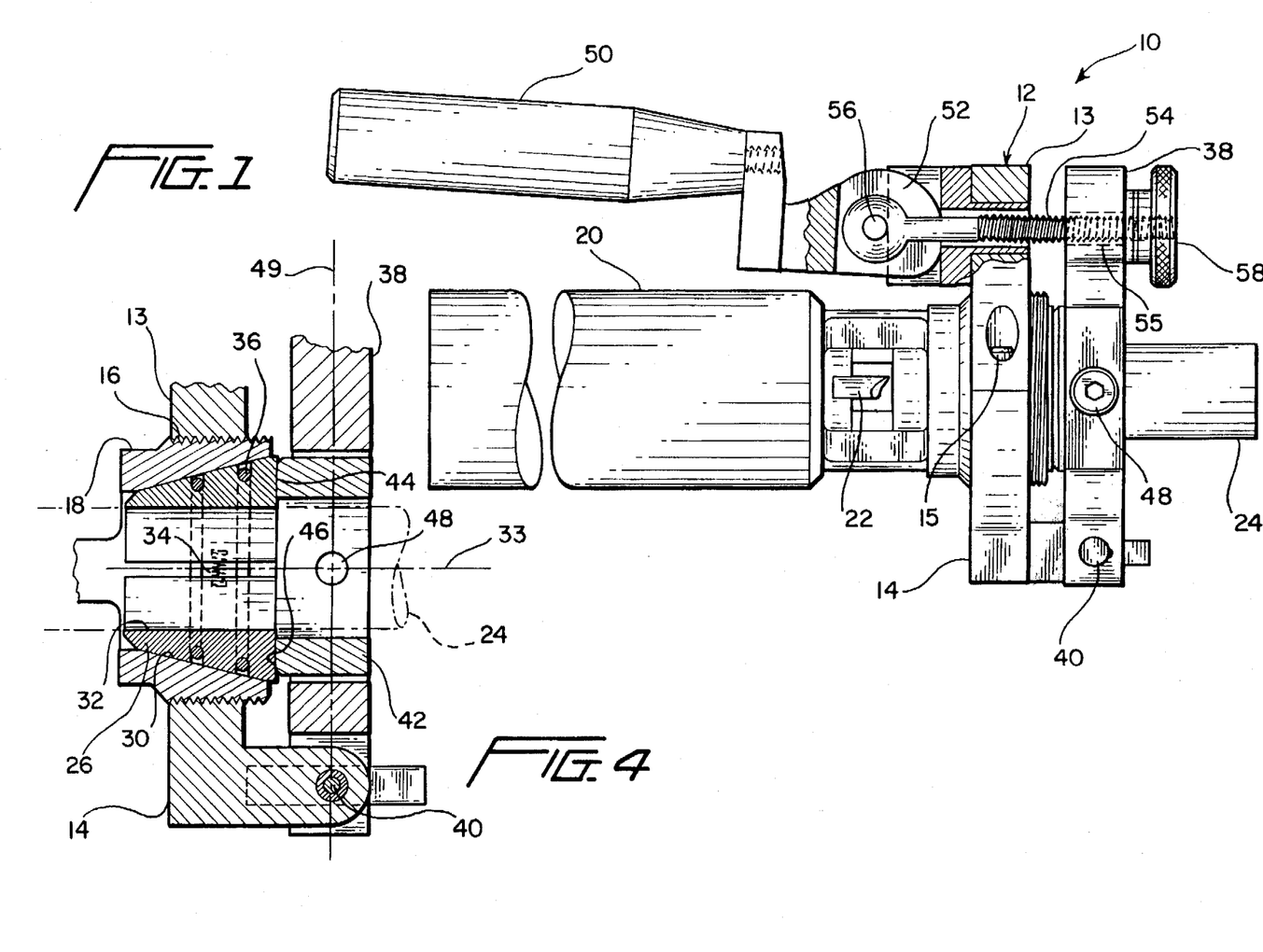
FIG. 1 is a side elevation view of a portable tube end squaring tool with a quick setting and release actuator constructed according to one preferred embodiment of the present invention mounted thereon.
FIG. 4 is a vertical section view taken along line IV—IV in FIG. 2.
Figures 2, 3:
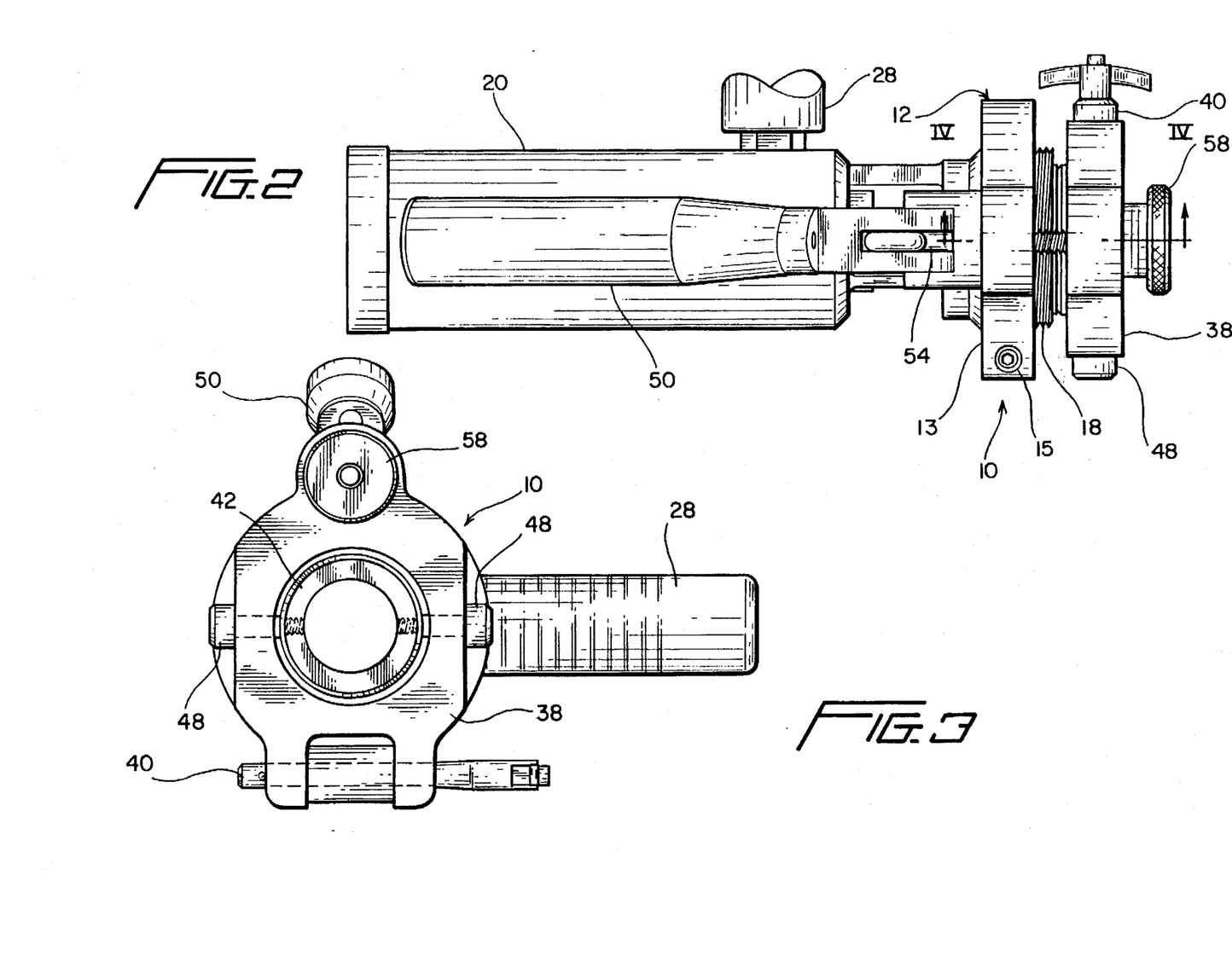
FIG. 2 is a plan view of FIG. 1.
FIG. 3 is a front elevation view of FIG. 1.

As shown in FIGS. 1 to 3, an exemplary embodiment of the quick setting and release actuator according to the present invention is shown at 10 and includes an anchor member 12 comprising, in accordance with this example, a split plate including upper portion 13 and lower portion 14, with portions 13 and 14 retained together by fastener 15. The anchor member 12 includes a central threaded bore 16 (see FIG. 4) that is threaded onto a male threaded fixture 18 that forms an end portion of a portable tube facing machine 20, for example of the type shown in U.S. Pat. No. 4,319,503.

The anchor member 12 also could be constructed as a single piece or different type of multi-piece assembly.

The tool 20 includes a cutter 22 that is rotated by a drive motor (not shown) to engage and cut the end of a tubular workpiece 24 that is normally held in clamped relationship with respect to the housing of the tool 20 by a split collet 26 (see FIG. 4). Clamping of a workpiece 24 within the collet 26 so that the end of the workpiece 24 is adjacent the cutter 22 enables advancement of the rotary driven cutter by operating handle 28 (see FIGS. 2 and 3) to face or square off the end of the tubular workpiece 24.

The collet 26 is normally actuated to engage the circumference of the tubular workpiece 24 by axially advancing the collet 26 within collet bearing surfaces 30 that are tapered inwardly in the advancing direction of the collet 26 such that advancement of the collet 26 to the left as shown in FIG. 4 causes the divided halves of the collet to contract inwardly and engage the circumference of a tubular workpiece 24 that is located within the central bore 32 of the collet 26 extending along axis 33. An appropriate expansion spring 34 and elastomeric bands 36 tend to cause the collet 26 to open after axial pressure on the collet is released. Withdrawal of a workpiece 24 axially to the right with respect to collet 26 also tends to allow the collet halves to open to a position for receiving the next workpiece. An appropriate mechanism may be provided to prevent the collet 26 from separating entirely from the end portion 18 of tool 20. While the collet 26 is illustrated with two sections, it is to be understood that the collet could be constructed of any number of sections in accordance with known principles of collet construction.

To permit rapid setting and releasing of the collet 26, the actuator 10 includes a thrust member carrier 38 that is pivotally connected for pivotal motion relative to the anchor member 12 by a transversely extending pin 40 such that the carrier 38 is pivotable about the pin 40 so that the carrier approaches and withdraws away from the anchor member 12 during at least part of its forward and rearward pivotal motion. Pin 40 in this embodiment is connected to the lower section 14 of anchor member 12. However, the pin 40 could be located in another position so that it is relatively fixed with respect to the anchor member 12 to permit carrier 38 to pivot in the described manner.

Carrier 38 carries a thrust member 42 for engaging the end wall or walls 44 of collet 26. As the carrier 38 approaches collet 26 in a forward pivoting direction towards the collet 26, the forward end 46 of the thrust member 42 engages the end wall 44 of collet 26 to cause advancement of the collet 26 and its inward motion along its bearing 30 to thereby cause contraction of the collet sections 26 around a workpiece that may be placed within the bore 32 of the collet.

The thrust member 42 is pivotally connected to the carrier 38 by transversely extending pivot pins 48 that enable the thrust member 42 to pivot about a transverse axis extending centrally through the pins 48. It will be apparent from FIG. 4 that the axis of pivotal motion of the thrust member 42 extending through the pins 48 lies in the same plane 49 that contains the central axis of the lower pivot pin 40 about which carrier 38 pivots and, in accordance with the preferred embodiment, the transverse axis of pivotal motion of thrust member 42 extends parallel to the pivot axis established by pin 40 to which carrier 38 is pivotally connected. Pivotally mounting the thrust member 42 in the carrier 38 permits the thrust member 42 to align itself with the end wall 44 of collet 26 even if carrier 38 is not exactly parallel with the end wall 44 so that the collet is axially moved uniformly towards its clamped position.

An actuator lever 50 is provided to enable manipulation of the carrier 38 to cause positive terminal pivotal motion about pin 40 adjacent anchor member 12. Lever 50 includes or is connected to a cam 52 that engages an adjacent surface of anchor member 12. The lever 50 is also pivotally connected to a threaded thrust transmitting rod or member 54 by means of a transverse pin 56 so that rotation of the lever 50 causes engagement of the cam 52 against the upper half 13 of the carrier 12, as seen in FIG. 1, which in turn, due to the curvature of the cam 52, causes the rod 54 to be drawn leftward as viewed in FIG. 1 as the lever 50 is rotated counterclockwise.

The thrust transmitting lever 54 extends through aperture 55 in carrier 38 and is connected to a thrust reaction member in the form of a nut 58 that is threaded onto a threaded portion of the thrust transmitting rod 54. The thrust nut 58 engages an upper wall surface of carrier 38, as illustrated in the drawings, and the distance between the pin 56 and the nut 58 is variable by rotating the nut 58 so that it is located at a desired position to actuate the collet 26 in a manner to be described below upon terminal pivotal motion of the carrier 38.

In operation of the embodiment shown in FIGS. 1–3, the nut 58 is adjusted on rod 54 so that, with the lever 50 in its upward or "collet unclamped" position, the carrier 38 will be permitted to rotate about pin 40 in a clockwise direction to permit collet 26 to be located in an open or "collet unclamped" position. In such "collet unclamped" position, the thrust member 42 will be moved away from its position adjacent the end wall 44 of collet 26 sufficient to enable the sections of the collet 26 to open for receiving or releasing a workpiece.

A tubular workpiece 24 is then inserted axially through the control bores of the thrust member 42 and the collet 26 until it is located at a desired position relative to the cutter 22 such that advancement of the cutter will engage the end of the tubular workpiece to cause removal of a portion of its end wall to thereby square or otherwise shape the end of the workpiece.

The lever 50 is then rotated counterclockwise as shown in FIG. 1 whereby cam 52 engages anchor member 12 and causes pin 56 to be drawn to the left as viewed in FIG. 1, thereby pulling rod 54 also to the left and likewise causing terminal pivoting movement of carrier 38 in a counterclockwise direction by nut 58 to cause thrust member 52 to engage the end wall 44 of collet 26 and to drive the collet 26 inwardly along its bearing 30 to thereby clamp the periphery of the workpiece 24. The lever 50 tends to remain in place due to the "overcenter" relationship between the cam 52, carrier 12, and pin 56 so that the collet 26 is locked in an advanced "collet clamped" position. The cutting operation on the end of the workpiece 24 may then be carried out by the tool 20 until it is desired to release the workpiece 24. Release of the workpiece is carried out simply by rotating the lever 50 upwardly in a clockwise direction as viewed in FIG. 1, which rotates carrier 38 and thrust member 42 away from the end wall 44 of collet 26, thereby releasing collet 26 and permitting it to move to a "collet unclamped" position.

To permit easy removal and disassembly of carrier 38 from its position adjacent anchor member 12, the pin 40 may be constructed in the form of a quick release pin that is well known in the art. More specifically, the quick release pin 40 is retained in its position by a detent mechanism (for example, a radially movable ball element) and may be readily removed from the carrier 38 by simply pressing a pin or lever to cause the detent to release the pin from the bore in which it is located. The nut 58 also may be removed from the rod 54 whereupon the carrier 38 will then be entirely freed from its position adjacent carrier 38 so that the collet 26 may be removed easily and interchanged with a different collet when desired. Different collets are utilized with the same tool 20 to permit the tool to be used with different size workpieces. Typically, collet 26 is removed through the larger end of the bearing surfaces 30 in the direction of the carrier 38. Thus, the ability to quickly and simply remove the carrier 38 away from the collet 26 to eliminate any interference with removal of the collet 26 from its bearing member constitutes an advantage of the invention.

It is to be understood that the embodiment of this invention as illustrated is exemplary only and that a different arrangement of the structural elements can be utilized for performing the same function in substantially the same way of operation and using the same principle as this embodiment of the invention.

For example, the lever and nut 58 may be reversed such that the cam 52 operates against the carrier 38 instead of the anchor member 12. Also, the anchor 12 may be secured to a tool in a different manner than that illustrated in the preferred embodiment. For example, carrier 12 could be bolted to the fixed housing of a machine tool with its central bore aligned with the workpiece holding collet of the machine tool. Also, while the thrust member 42 is shown directly engaging the end wall 44 of collet 26, if a space exists between the collet 26 and the thrust member 42, a spacer element could be utilized between the collet 26 and the thrust member 42 to transmit thrust between the thrust member 42 and the end wall 44 of collet 26.

It is also to be understood that the arrangement of the pivot pin 40 could be varied without departing from the spirit and scope of the invention. For example, if the carrier 12 constituted part of or was integrated with the housing of a machine tool, the pivot 40 could be located on the housing of the tool to provide a pivot attachment for the carrier 38 adjacent the anchor member 12. Also, the pivot pins 48 for mounting the thrust member 42 in the carrier 38 could be varied by using different structures that would nevertheless permit desired pivotal movement of thrust member 42 relative to carrier 38.

The shape of the cam 42 illustrated in FIGS. 1-3 likewise is exemplary and could be varied to suit the needs of the applying a force to the carrier 38 at its terminal pivot position whereat it exerts an axial driving force against collet 26 through the thrust member 42. Also, the construction of collet 26 could be varied to suit specific requirements. For example, a cam arrangement for driving pins radially inwardly against a workpiece could be substituted for the collet 26 and its bearing surfaces and various other type work holding chucks could be utilized so long as they can be actuated by means of a generally axially applied thrust resulting from the pivotal motion of carrier 38.

Collet 26, of course, could be reversed such that the collet sections ride along an internal bearing surface so that the collet sections are expanded outwardly into engagement with a hollow workpiece in accordance with known principles. Also, axial thrust to actuate the collet 26 could be applied to the bearing surfaces 30 while the collet sections 26 are held fixed relative to a tool housing to effect the clamping action of the collet 26.

Various types of clamping arrangements could be utilized whereby the quick setting and release actuator 10 could be universally or specially mounted on various tool housings to actuate work holding chucks by transmitting axial force thereto by means of a carrier 38. While the rod 54 extends through aperture 55 in carrier 38 in accordance with this preferred embodiment, the aperture 55 could be extended radially outwardly in carrier 38 in the form of a groove and a similar opening could be provided in anchor 12 such that at least the rod 54 could be pivoted outwardly away from carrier 38 through such grooves about pin 56. This would permit quick release of the rod 54 and nut 58 from carrier 38 to permit the carrier 38 to be pivoted or moved away from the collet 26.

Figure 5:
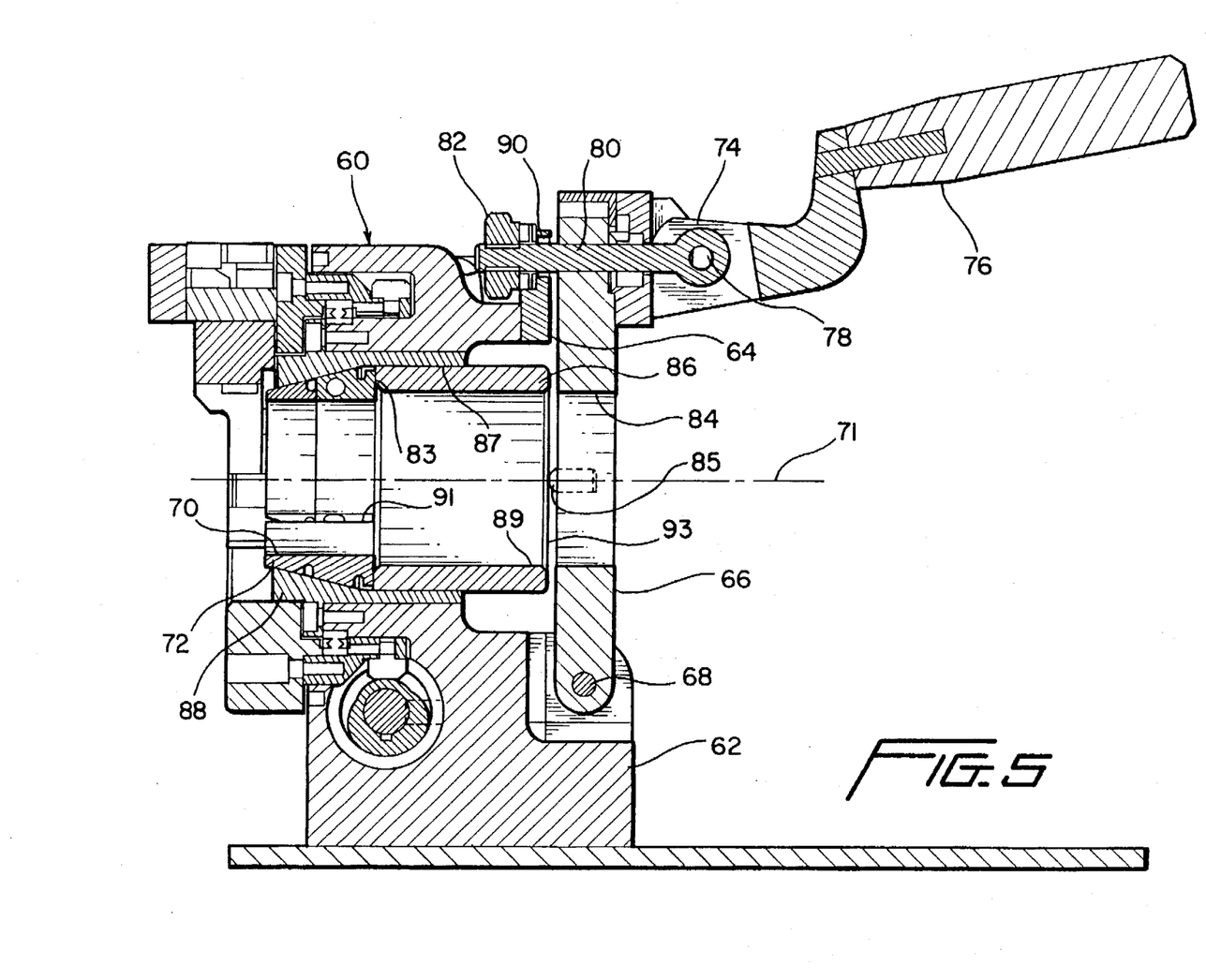
FIG. 5 illustrates another embodiment of a quick setting and release actuator constructed in accordance with this invention.
Figure 6:
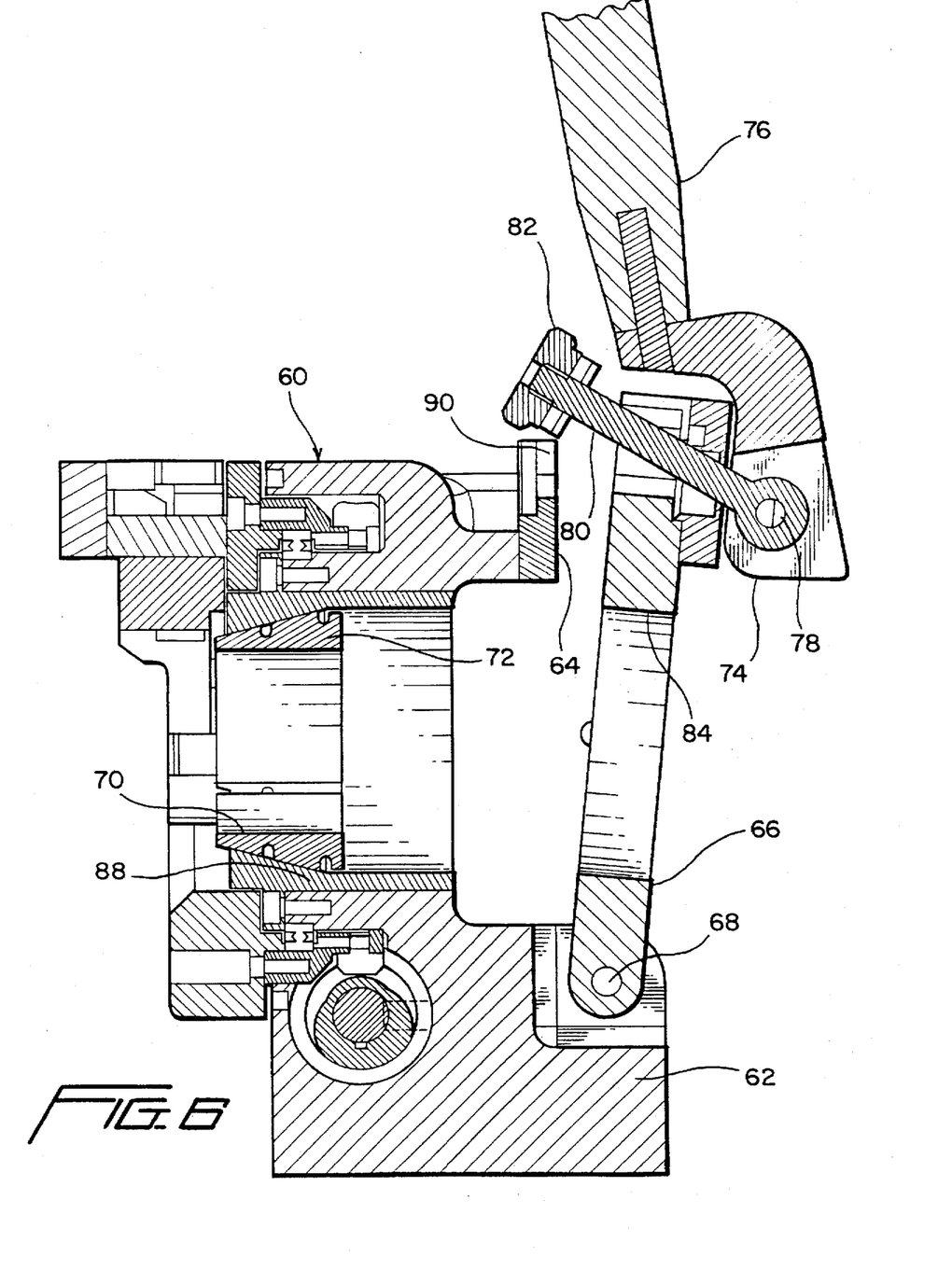
FIG. 6 shows the embodiment of the quick setting and release actuator illustrated in FIG. 5 in an open position.

FIGS. 5 and 6 show an alternate embodiment of the quick setting and release actuator according to the present invention. In this embodiment, a machine tool 60 includes a housing 62 to which anchor member 64 and carrier 66 are secured. Anchor member 64 is fixedly secured to the housing 62 of the tool 60, whereas carrier 66 is pivotally connected to the housing 62 by a pivot pin 68 that extends transversely relative to the central bore 70 lying along imaginary axis 71 extending through collet 72 used to clamp a tubular workpiece (not shown) in the tool 60.

The carrier 66 is pivoted about pin 68 by means of a lever actuated cam 74 associated with carrier 66. Rotation of lever 76 carrying cam 74 clockwise as shown in FIG. 5 causes camming of the carrier 66 towards a terminal pivoted position by means of pin 78 carried by lever 76, threaded thrust transmitting rod 80 and thrust reacting nut 82 acting against anchor 64. Nut 82, of course, is threaded on threaded rod 80 so that fine adjustments can be made to the terminal position of carrier 66.

Due to the spacing between carrier 66 and the rear face 83 of collet 72, a thrust transmitting spacer 86 is provided to transmit thrust between thrust member 84 and the rear face of collet 72. The thrust transmitting spacer 86 is axially movable within bore 87 extending along imaginary axis 71 and includes a bore 89 generally concentric with a bore 91 of collet 72.

As shown in FIG. 6, due to the location of pin 68 on housing 62, release of nut 82 from contact with anchor 64 permits pivotal motion of carrier 66 away from the area of the collet 72 to permit changing of the spacer 86 and changing of collet 72 in its bearing 88. To permit upward pivotal motion of rod 80 about pin 78 to free nut 82 from anchor member 64, a groove 90 is provided at the upper end of anchor member 64 which permits upward swinging motion of rod 80 away from anchor member 64 when nut 82 is loosened on rod 80. In FIG. 6, the spacer 86 has been removed from the assembly.

In accordance with this embodiment of the invention, carrier 66 includes a bore 84 that is generally concentric with the bore 91 of collet 72 when the carrier 66 is pivoted towards it terminal pivoted position. A pair of thrust members 85 having radiused or rounded ends are provided in diametrically opposed sides of bore 84 and secured in such positions on carrier 66, for example, by press fitting the members 85 into bores drilled into carrier 66. Any suitable arrangement can be provided to secure the thrust members 85 on carrier 66. The thrust members 85 are located in transversely spaced relationship on diametrically opposed sides of bore 84 substantially in a transverse plane including imaginary axis 71. Accordingly, upon terminal pivoted motion of carrier 66, the rounded tips of thrust members 85 will engage the rear face 93 of spacer 86 to cause its axial displacement to the left as shown in FIG. 5 to thereby axially displace collets sections 72 towards their clamped positions. The rounded tips of the thrust members 85 ensure that proper contact is made with the rear face 93 of spacer 86 even if carrier 66 is not parallel to the rear face 93 of spacer 86 at its terminal pivoted position. The engaging surfaces of thrust members 85 and rear surface 93 are appropriately hardened to avoid excessive wear during use of the actuator.

In both embodiments of the invention, carrier 66 is mounted such that it pivots towards and away from its respective anchor member about a transverse axis extending transversely of the collet bore. It is to be understood that the actuator system could also be arranged for pivotal motion about a vertical axis located to one side of the collet bore with the actuator lever operable in a generally horizontal plane. Thus, this invention is not limited to the specific orientation of the pivot axis for the carrier of the actuator system and the access could be located in any desirable position that will enable convenient manipulation of the lever of the actuator system during its operation. If the pivot axis established by pin 68 in the embodiment of the invention shown in FIGS. 5 and 6 was oriented in a vertical or other direction, the thrust members 85 would be positioned such that they would lie on diametrically opposed sides of bore 84 in a suitable position to engage diametrically opposed areas of the rear surface 93 of spacer 86 during terminal pivotal motion of the carrier 66 to ensure that the spacer 86 is uniformly driven in an axial direction towards collet 72. Various other forms of thrust members 85 could be utilized provided that they functioned in the same manner as the illustrated embodiment.

The embodiments of the invention described herein are intended to be exemplary only and the invention is to be limited solely by the scope of the claims that follow.

We claim:

1. A quick setting and release actuator for cooperating with an axially movable chuck for a tubular workpiece comprising:

an anchor member;

a thrust member carrier pivotally mounted for forward and rearward pivotal motion relative to the anchor member about an arcuate path such that the carrier approaches and recedes from the anchor member during at least part of its forward and rearward pivotal motion, respectively;

at least one thrust member mounted on the carrier and which is movable with the carrier towards and away from the anchor member upon forward and rearward pivotal motion of the carrier; and a locking device for securing the carrier at a forward pivoted position and for preventing pivotal motion of the carrier away from the anchor member at said forward pivoted position; and wherein said at least one thrust member is mounted for pivotal motion relative to the carrier.

2. The quick setting and release actuator according to claim 1, wherein said locking device includes a thrust actuator for positively driving the carrier pivotally towards the anchor member.

3. The quick setting and release actuator according to claim 1, wherein said carrier is pivotally mounted at a carrier pivot connection that defines an axis of pivotal motion of the carrier, said carrier pivot connection being located towards one side of and spaced away from said thrust member.

4. The quick setting and release actuator according to claim 3, wherein said carrier pivot connection pivotally connects the carrier to the anchor member.

5. The quick setting and release actuator according to claim 3, wherein said locking device includes a thrust actuator for positively driving the carrier pivotally towards the anchor member.

6. The quick setting and release actuator according to claim 3, wherein the thrust actuator is a lever operated cam and a thrust reaction member connected to the cam by a threaded thrust transmitting rod, said cam connected to one of the anchor member or carrier, said thrust reaction member engageable against the other of the anchor member and carrier, and said thrust transmitting rod extending between the cam and the thrust reaction member.

7. The quick setting and release actuator according to claim 3, wherein said thrust member includes a workpiece receiving bore and wherein said thrust member is pivotally connected to the carrier; and further including a thrust member pivot connection defining an axis of pivotal motion of said thrust member, said last recited axis lying in a same plane that includes the carrier pivot connection.

8. The quick setting and release actuator according to claim 7, wherein said carrier pivot connection further defines an axis of pivotal motion of said carrier, and wherein said axis of pivotal motion of the thrust member extends parallel to the axis of pivotal motion of the carrier.

9. The quick setting and release actuator according to claim 8, further wherein said locking device includes a thrust actuator for positively driving the carrier pivotally towards the anchor member.

10. The quick setting and release actuator according to claim 9, further wherein the thrust actuator is a lever operated cam and a thrust reaction member cooperating with the cam, said cam connected to one of the anchor member or carrier, said thrust reaction member engageable against the other of the anchor member and carrier.

11. A quick setting and release actuator according to in claim 1, including a quick release mechanism for releasing said carrier from its pivot mounting.

12. A quick setting and release actuator for cooperating with an axially movable chuck for a tubular workpiece comprising:

an anchor member;

a thrust member carrier pivotally mounted for forward and rearward pivotal motion relative to the anchor member about an arcuate path such that the carrier approaches end recedes from the anchor member during at least part of its forward and rearward pivotal motion, respectively;

at least one thrust member mounted on the carrier and which is movable with the carrier towards and away from the anchor member upon forward and rearward pivotal motion of the carrier; and a locking device for securing the carrier at a forward pivoted position and for preventing pivotal motion of the carrier away from the anchor member at said forward pivoted position; and wherein the thrust actuator is a lever operated cam ant thrust reaction member cooperating with the cam, said cam connected to one of the anchor member or carrier, said thrust reaction member engageable against the other of the anchor member and carrier.

13. A quick setting and release actuator for cooperating with an axially movable chuck for a tubular workpiece comprising:

an anchor member;

a thrust member carrier pivotally mounted for forward and rearward pivotal motion relative to the anchor member about an arcuate path such that the carrier approaches and recedes from the anchor member during at least part of its forward and rearward pivotal motion, respectively;

at least one thrust member mounted on the carrier and which is movable with the carrier towards and away from the anchor member upon forward and rearward pivotal motion of the carrier; and a locking device for securing the carrier at a forward pivoted position and for preventing pivotal motion of the carrier away from the anchor member at said forward pivoted position; and a thrust transmitting member adapted to cooperate with said thrust member; said carrier including a bore for receiving a workpiece; said thrust member comprising at least one thrust element having a rounded end surface adapted to engage said thrust member, said at least one thrust element being located on one side of said bore.

14. A quick setting and release actuator for cooperating with a holding chuck for a tubular workpiece comprising:

a holding chuck for engaging a tubular workpiece and including at least one radially movable segment arranged to be radially moved such that upon axial motion of the segment relative to the bearing surface, the segment engages and retains an adjacent workpiece in a fixed location relative to the chuck;

an anchor member located adjacent the chuck in a relatively fixed position;

a thrust member carrier pivotally mounted on a carrier pivot connection for forward and rearward pivotal motion relative to the anchor member about an arcuate path such that the carrier approaches and recedes from the anchor member during at least part of its forward and rearward pivotal motion, respectively;

at least one thrust member mounted on the carrier and which is movable with the carrier towards and away from the anchor member upon forward and rearward pivotal motion of the carrier, said thrust member arranged to apply a driving axial force to the chuck to drive the chuck segment towards a workpiece engaging position at said forward pivoted position of the carrier;

a locking device for securing the carrier at said forward pivoted position and for preventing pivotal motion of the carrier away from the anchor member at said forward pivoted position; and wherein said at least one thrust member is mounted for pivotal motion relative to the carrier.

15. The quick setting and release actuator according to claim 14, wherein said locking device includes a thrust actuator for positively driving the carrier pivotally towards the anchor member.

16. The quick setting and release actuator according to claim 15, wherein the thrust actuator is a lever operated cam and a thrust reaction member cooperating with the cam, said cam connected to one of the anchor member or carrier, said thrust reaction member engageable against the other of the anchor member and carrier.

17. The quick setting and release actuator according to claim 14, wherein said carrier pivot connection defines an axis of the pivotal motion of the carrier, said carrier pivot connection being located towards one side of and spaced away from said thrust member.

18. The quick setting and release actuator according to claim 14, including a thrust member pivot connection defining an axis of pivotal motion of said thrust member relative to the carrier, said last recited axis lying in the same plane that includes the axis of pivotal motion of the carrier.

19. The quick setting and release actuator according to claim 18, wherein said carrier pivot connection axis is located towards one side of and spaced away from said thrust member.

20. The quick setting and release actuator according to claim 19, wherein said thrust member is pivotally mounted to the carrier by a thrust member pivot connection that defines an axis of pivotal motion of the thrust member relative to the carrier and which extends parallel to the axis of pivotal motion of the carrier.

21. The quick setting and release actuator according to 14, including a machine tool having a relatively fixed housing associated therewith, said anchor member and chuck secured to the housing of said machine tool.

22. A quick setting and release actuator for cooperating with a holding chuck for a tubular workpiece comprising:

a holding chuck for engaging a tubular workpiece and including at least one radially movable segment arranged to be radially moved such that upon axial motion of the segment relative to the bearing surface, the segment engages and retains an adjacent workpiece in a fixed location relative to the chuck;

an anchor member located adjacent the chuck in a relatively fixed position;

a thrust member carrier pivotally mounted on a carrier pivot connection for forward and rearward pivotal motion relative to the anchor member about an arcuate path such that the carrier approaches and recedes from the anchor member during at least part of its forward and rearward pivotal motion, respectively;

at least one thrust member mounted on the carrier and which is movable with the carrier towards and away from the anchor member upon forward and rearward pivotal motion of the carrier, said thrust member arranged to apply a driving axial force to the chuck to drive the chuck segment towards a workplace engaging position at said forward pivoted position of the carrier;

a locking device for securing the carrier at said forward pivoted position and for preventing pivotal motion of the carrier away from the anchor member at said forward pivoted position; and said chuck and housing including coaxial bores for receiving a workpiece; a thrust transmitting spacer member located within the bore in the housing adjacent said collet; said thrust member arranged to be axially movable within the bore in the housing towards and away from the movable segment of said collet, said spacer member drivingly engaging said collet segment and moving the segment towards a workpiece fixing position when said spacer member is moved towards and against the collet segment; said carrier including a workpiece receiving carrier bore; said thrust member comprising a pair of thrust elements having rounded end surfaces and spaced on diametrically opposed sides the carrier bore.

23. A quick setting and release actuator for cooperating with an axially movable chuck for a tubular workpiece comprising:

an anchor member;

a thrust member carrier pivotally mounted for forward and rearward pivotal motion relative to the anchor member about an arcuate path such that the carrier approaches and recedes from the anchor member during at least part of its forward and rearward pivotal motion, respectively;

at least one thrust member mounted on the carrier and which is movable with the carrier towards and away from the anchor member upon forward and rearward pivotal motion of the carrier; and a locking device for securing the carrier at a forward pivoted position and for preventing pivotal motion of the carrier away from the anchor member at said forward pivoted position;

wherein said carrier is pivotally mounted at a carrier pivot connection that defines an axis of pivotal motion of the carrier, said carrier pivot connection being located towards one side of and spaced away from said thrust member; and wherein the thrust actuator is a lever operated cam and a thrust reaction member connected to the cam by a threaded thrust transmitting rod, said cam connected to one of the anchor member or carrier, said thrust reaction member engageable against the other of the anchor member and carrier, and said thrust transmitting rod extending between the cam and the thrust reaction member.

24. A quick setting and release actuator for cooperating with an axially movable chuck for a tubular workpiece comprising:

an anchor member;

a thrust member carrier pivotally mounted for forward and rearward pivotal motion relative to the anchor member about an arcuate path such that the carrier approaches and recedes from the anchor member during at least part of its forward and rearward pivotal motion, respectively;

at least one thrust member mounted on the carrier and which is movable with the carrier towards and away from the anchor member upon forward and rearward pivotal motion of the carrier; and a locking device for securing the carrier at a forward pivoted position and for preventing pivotal motion of the carrier away from the anchor member at said forward pivoted position;

wherein said carrier is pivotally mounted at a carrier pivot connection that defines an axis of pivotal motion of the carrier, said carrier pivot connection being located towards one side of and spaced away from said thrust member; and wherein said thrust member includes a workpiece receiving bore and wherein said thrust member is pivotally connected to the carrier; and further including a thrust member pivot connection defining an axis of pivotal motion of said thrust member, said last recited axis lying in a same plane that includes the carrier pivot connection.

25. The quick setting and release actuator according to claim 24, wherein said carrier pivot connection further defines an axis of pivotal motion of said carrier, and wherein said axis of pivotal motion of the thrust member extends parallel to the axis of pivotal motion of the carrier.

26. The quick setting and release actuator according to claim 25, further wherein said locking device includes a thrust actuator for positively driving the carrier pivotally towards the anchor member.

27. The quick setting and release actuator according to claims 26, further wherein the thrust actuator is a lever operated cam and a thrust reaction member cooperating with the cam, said cam connected to one of the anchor member or carrier, said thrust reaction member engageable against the other of the anchor member and carrier.

* * * * *